United States Patent [19]

Garner et al.

[11] 3,883,629

[45] May 13, 1975

[54] INJECTION MOLDING OF LAMINAR ARTICLES HAVING A FOAM CORE AND AN INTEGRAL SKIN

[75] Inventors: Paul Johnson Garner, Thorpe Bay; David Fairclough Oxley, St. Albans, both of England

[73] Assignee: Imperial Chemical Industries Limited, London, England

[22] Filed: Sept. 12, 1972

[21] Appl. No.: 288,328

Related U.S. Application Data

[63] Continuation-in-part of Ser. No. 887,751, Dec. 23, 1969, abandoned.

[30] Foreign Application Priority Data

Dec. 31, 1968 United Kingdom............... 61963/68

[52] U.S. Cl. ..................... 264/55; 264/45; 264/51; 264/53; 264/54; 264/313; 264/328; 264/DIG. 14; 264/DIG. 83
[51] Int. Cl. ..................... B29d 27/00; B29d 9/00
[58] Field of Search ............ 264/45, 51, 53, 54, 55, 264/328, 313, DIG. 83

[56] References Cited

UNITED STATES PATENTS

| | | | |
|---|---|---|---|
| 3,007,209 | 11/1961 | Roberts | 264/55 X |
| 3,341,481 | 9/1967 | Palmer | 264/55 X |
| 3,378,612 | 4/1968 | Dietz | 264/45 |
| 3,599,290 | 8/1971 | Garner | 264/45 X |

FOREIGN PATENTS OR APPLICATIONS

| | | | |
|---|---|---|---|
| 1,219,097 | 1/1971 | United Kingdom | 264/45 X |

OTHER PUBLICATIONS

T883,004—Defensive Publication–Sandiford et al., Feb. 2, 1971, filed Oct. 27, 1969.

*Primary Examiner*—H. S. Cockeram
*Attorney, Agent, or Firm*—Cushman, Darby & Cushman

[57] ABSTRACT

In a process in which a laminated article is produced by injection moulding by sequentially injecting two charges of thermoplastic material through the same sprue into a mould making the first charge of sufficient size to fill the mould cavity and then enlarging the mould cavity to allow the second charge to be introduced.

10 Claims, No Drawings

INJECTION MOLDING OF LAMINAR ARTICLES HAVING A FOAM CORE AND AN INTEGRAL SKIN

This application is a continuation-in-part of application Ser. No. 887,751 filed Dec. 23, 1969, now abandoned.

The present invention relates to improvements in or relating to the production of laminar articles having a core enclosed in a surface skin.

It has already been proposed to produce such laminar articles from synthetic resin materials by sequentially injecting two or more molten charges of injection moldable synthetic resin material into a mold through a common injection orifice. In these processes the first charge, i.e., skin composition, that is injected into the mold is not sufficiently large to fill the mold cavity and the cavity is filled by the injection of the further charges, i.e., core composition which extend the skin composition to the extremities of the mold cavity.

In this process provision has to be made for switching from injection of the skin composition to injection of the core composition. To avoid contamination of skin composition by the core composition it is often desirable to stop the supply of skin composition before commencing supply of the core composition. In this way there is a time interval, which may only be a small fraction of a second, when no material is being injected into the mold cavity and so, for a period, the melt front of the skin composition injected into the mold becomes stationary or only advances at a much reduced rate.

We have found that a line tends to be formed on the surface of the molding at the position where the melt front became stationary or was slowed down. This line is believed to be caused by differential solidification rates of the skin composition in contact with the mold wall to that of the skin composition not in contact with the mold wall but rather in contact with air in the mold cavity.

The severity or prominence of the line will of course depend on a variety of factors including the natures and temperatures of the skin composition and the mold wall and the length of the period for which the melt front was stationary or its advance was slowed down. However a line is liable to occur to a greater or lesser extent whatever combination of these conditions is used, particularly when the mold wall is at such a temperature that solidification of the skin composition is enhanced.

The object of this invention is to provide a molding process in which this line does not appear.

This object is realised by using an enlargeable mold cavity and arranging that the cavity is completely filled with the skin composition so that when switching to injection of core composition takes place and the melt front of the skin composition becomes stationary, or its rate of advance is reduced, all the melt front is in contact with the mold wall. When the core composition is injected, the mold cavity is enlarged by virtue of the injection pressure on the core composition so that the cavity accommodates the core composition while maintaining the skin composition in contact with the mold walls.

Accordingly we provide an injection molding process for the production of laminar articles having a core of a synthetic polymeric resin composition enclosed by a skin of a dissimilar synthetic polymeric resin composition, wherein a molten charge of an injection moldable skin forming synthetic polymeric resin composition, is injected into a mold cavity and, before the interior of the skin forming composition has set, a molten charge of an injection moldable core forming synthetic polymeric resin composition is injected into the interior of the skin forming composition, and maintaining the compositions in the mold cavity until they have set, the improvement comprising filling the mold cavity with said skin forming composition and then injecting the core forming composition so that the injection pressure of the core forming composition forces the cavity to enlarge to accommodate the core forming composition as it is injected.

We have found that the most convenient way to ensure that the core composition is injected into the interior of the skin composition which is already in the mold is to sequentially inject the compositions through a common injection orifice.

The process of the present invention is preferably carried out in a machine in which the synthetic polymeric resinous compositions are introduced into the mold through a common sprue to which the compositions are fed from separate injection molding machines. A valve may conveniently be provided at the join of the channels from the two machines to control which composition may enter the sprue at any one time. The operation of the machines, including the switching of the valve, the movement of the plungers of the molding machines and the opening of the mold must all be synchronised so that the mold cavity is enlarged by virtue of the injection of the core composition.

Suitable apparatus is described in U.S. Pat. No. 3,599,290, the entire disclosure of which is incorporated herein by reference.

The design of the mold should be such that there is minimum loss of material from the mold during the molding cycle especially when the compositions are under high pressure.

The mold is conveniently of the vertical flash type comprising a punch slidably located inside a female mold member. In this way retraction of the punch relative to the female mold member enlarges the mold cavity. The punch is preferably located in relation to the female mold member so that the direction of retraction of the punch is essentially perpendicular to the major dimension of the molding. Thus, a small retraction distance of the punch will provide a relatively large increase in mold volume, with a minimum stretch of the skin in the direction of the retraction of the punch. The mold is conveniently enlarged by reducing the clamping force holding the mold members in the smaller volume condition so that, as the core compsotion is injected, the injection pressure on the core composition forces the mold members to slide relative to one another to enlarge the cavity. In this way the skin composition is maintained in contact with the mold walls as the mold is enlarged by virtue of the injection pressure of the core composition.

In a preferred embodiment of the present invention the volume of the mold cavity is reduced after the injection of the skin composition and before injection of the core composition.

This reduction in volume compresses or squeezes the skin composition to the extremities of the mold cavity so as to ensure complete filling thereof.

This reduction in volume may be achieved when using a vertical flash type mold by increasing the clamping force holding the two mold members together, or in the first instance, the mold members may be held apart by wedges inserted between the mold members such that the cavity volume is not at its minimum and these wedges may be removed so that the volume of the mold cavity is reduced by the clamping force.

Synthetic polymeric resin compositions that may be used in the present invention are those which can be injected into a mold cavity while in the state of a viscous liquid and which can thereafter be caused to solidify in the mold cavity. Thus synthetic thermoplastic polymeric resin compositions that solidify on cooling may be used. These can be injected in the form of viscous melts and allowed to solidify in the mold cavity by cooling. Alternatively synthetic thermosetting polymeric resin compositions may be used. These can be injected into the mold cavity in the state of a viscous liquid and then caused to solidify by effecting cross-linking while in the cavity. Generally the synthetic thermosetting polymeric resinous compositions are cross-linked by heating.

Examples of suitable injection moldable synthetic thermoplastic polymeric resins which may be used in the compositions include polymers and copolymers of α-olefines, such as high and low density polyethylene, polypropylene, polybutene, poly-4-methyl pentene-1, propylene/ethylene copolymers, copolymers of 4-methyl pentene-1 with linear α-olefines containing 4 to 18 carbon atoms, and ethylene/vinyl acetate copolymers; polymers and copolymers of vinyl chloride, vinyl acetate, vinyl butyral, styrene, substituted styrenes such as α-methyl styrene, acrylontrile, butadiene, methyl methacrylate, vinylidene chloride. Specific examples of such polymers include vinyl chloride homopolymers and copolymers of vinyl chloride with vinyl acetate, propylene, ethylene, vinylidene chloride, alkyl acrylates such as 2-ethyl hexyl acrylate, alkyl fumarates, alkyl vinyl ethers, such as cetyl vinyl ether, and N-aryl maleimides such as N-o-chlorophenyl maleimide; polyvinyl acetate, polyvinyl butyral; polystyrene, styrene/acrylonitrile copolymers; copolymers of butadiene with methyl methacrylate and/or styrene and optionally acrylonitrile; polymethyl methacrylate; copolymers of methyl methacrylate with minor amounts of alkyl acrylate such as methyl acrylate, ethyl acrylate and butyl acrylate; copolymers of methyl methacrylate, N-aryl maleimides and optionally styrene; and vinylidene chloride/acrylonitrile copolymers; melt processable copolymers of tetrafluoroethylene and hexafluoropropylene.

Halogenated polymers or copolymers may be used; for example halogenated α-olefine polymers, such as chlorinated polyethylene, or halogenated vinyl chloride polymers, such as chlorinated polyvinyl chloride.

Other injection moldable synthetic thermoplastic resins that may be used in the compositions include condensation polymers such as the injection molding grades of linear polyesters such as polyethylene terephthalate; polyamides such as polycaprolactam, polyhexamethylene adipamides and copolyamides such as copolymers of hexamethylene diamine adipate and hexamethylene diamine isophthalate, particularly those containing from 5 to 15% by weight of hexamethylene diamine isophthalate; polysulphones and copolysulphones; polyphenylene oxides; polycarbonates, thermoplastic oxymethylene polymers; thermoplastic linear polyurethanes; and the thermoplastic derivatives of cellulose such as cellulose acetate, cellulose butyrate, and mixed cellulosic esters, for example cellulose acetate butyrate.

Where a copolymer is used, the amounts of the comonomers that are used in the copolymer will depend, inter alia, on the properties required of the molding. Any conventional monomer ratios may be used, for example 1 to 99% of one or the other monomer units.

Thermosetting resins include plastics compositions that either undergo cross-linking of their own accord or in the presence of a hardener or catalyst when heated to a sufficiently high temperature. Thus the term includes a composition falling within the commonly understood ambit of the term "thermosetting," and also a composition which is normally thermoplastic but contains a cross-linking agent such as a peroxide which causes cross-linking when the composition is heated to a sufficiently high temperature.

Examples of suitable synthetic thermosetting polymeric resins that may be used in the compositions include phenol-aldehyde resins, amine-formaldehyde resins, urea-formaldehyde resins, epoxy resins, polyester resins, thermosetting polyurethanes, and vulcanisable rubbers.

The compositions may contain a hardening agent or catalyst where this is necessary to enable the composition to set.

Injection moldable cross-linkable synthetic thermoplastic polymeric compositions include copolymers of methyl methacrylate and glycol dimethacrylate and ethylene/vinyl acetate copolymers in admixture with a cross-linking agent.

Blends of plastics materials may be used in the compositions.

The core forming composition may be the same as the skin forming composition with the exception of additives which are included in one or in the other of the compositions or in both but in different proportions. Alternatively the polymers in the compositions may be quite different and also the compositions may contain different additives.

The choice of compositions from which the article is to be made will depend upon the use to which the article is to be put. The process of the present invention does, however, provide a particularly useful way of producing laminar articles having a core of a relatively cheap composition provided with a good facing. For example, the core may be of a composition containing a filler whereas the outer skin of a more expensive composition may provide any desired surface finish. If the process is used to produce parts of the bodies of motor vehicles, then a stiff outer skin will be required and filled polypropylene is a particularly good resin from which to form the outer skin and may conveniently be used in the skin composition in the process of this invention. However, if a flexible molding is required, for example, for the interior trim of a motor car, then plasticised vinyl chloride polymer composition will be eminently suitable as the skin composition.

The mold walls may be cooled, if the skin composition is a thermoplastic composition, to enhance setting of the composition being processed. Preferably mold wall temperatures between 0° and 100°C are utilised. Equally, if the skin composition is one that is solidified on heating, e.g., a thermosetting resin composition, the mold walls may be heated to enhance setting of the skin composition. The choice of wall temperature will of course depend on the compositions being processed.

In a preferred embodiment of the present invention the core composition contains a blowing agent and is injected into the mold at above the temperature at which the blowing agent would cause foaming. The blowing agent may be a solid which decomposes on heating to yield a gas which foams the core composition or may be a liquid which vaporises on heating to foam the core composition. When the core composition is foamable, the mold cavity may be allowed to enlarge to a sufficient extent as the core composition is injected so that the core composition foams as it is injected. Alternatively, and as is preferred, the cavity is enlarged by means of the injection of the core composition against a restraining force sufficient to prevent foaming of the core composition and, after injection of the core composition, the mold is then further enlarged to allow the core composition to foam. It is preferred to use the second of these alternatives as this provides a more regular cell structure in the core of the molded article and also produces an article with superior surface finish. In this embodiment the foamable core material should be injected under sufficient pressure and at a sufficient speed to prevent the core material foaming before the mold is filled. Standard injection molding rates and pressures have been found to be satisfactory e.g. such that the mold cavity is filled in less than 10 seconds, to achieve which pressures generally between 10,000 p.s.i.g. and 30,000 p.s.i.g. have to be employed.

If the mold is to be further enlarged after the injection of foamable core material to allow the core composition to foam, this further enlargement may be effected in various ways. The mold may be opened by some external force which may instantaneously enlarge the cavity to the desired extent or may gradually enlarge the cavity. Alternatively, the clamping force holding the mold members in position relative to one another may be reduced so that the pressure of the gases generated by the volatilisation or decomposition of the blowing agent forces the mold members to move relative to one another to enlarge the mold cavity. The clamping force may be reduced gradually allowing a gradual expansion of the mold cavity or reduced instantaneously allowing a sudden expansion.

The size and shape of the mold cavity depends on the article being produced but molds of maximum cavity thickness less than 1 inch preferably between 0.08 inch and 0.40 inch thick are particularly useful.

The proportions of the skin and core compositions used will depend on a variety of factors but it will be appreciated that for any given compositions, mold configuration and processing conditions, e.g., temperatures, pressures, there will be a minimum amount of skin composition that has to be injected in order to avoid the core composition bursting through the skin. This minimum can readily be determined by a few trial moldings.

In a preferred embodiment a further quantity of the skin composition is injected into the mold cavity after injection of the core composition. In this way, when the sprue is removed from the molding, the exposed surface only exhibits a narrow annulus of exposed core composition as the central portion of the sprue channel is filled with the further quantity of skin composition.

The process of the present invention may be used to produce a wide variety of articles. For example, articles with a rigid or with a flexible skin may be prepared. Examples of articles with a rigid skin included articles of furniture and panels which may be building panels or panels to form the bodies of motor vehicles and trains. Examples of articles with a flexible skin include parts of the interior trim of motor cars, railway carriages, caravans, aeroplanes and a wide variety of other applications. In one embodiment of the invention at least part of one or more walls of the mold cavity may be lined with a removable insert prior to the injection of the compositions into the mold. The skin composition will then adhere to the insert when it has been injected into the mold and thus this technique may be used to provide a rigid backing to, for example, a cellular article having an unfoamed skin. This is particularly useful in the production of flexible moldings for the interior trim of motor vehicles, where it is desirable to have a resilient trim with a pleasing surface which can be rigidly mounted in the motor vehicle; in this case one of the walls of the mold may be lined to provide the backing to mount the trim whereas the other is not lined thus providing the pleasing surface. Alternatively, the lining could, if desired, be of a flexible material. The insert should be form stable at the temperatures encountered in the molding cycle. Thus generally it should have a melting point above the injection temperatures of the skin and core composition. Examples of suitable lining materials include wooden sheets such as plywood and hardboard, metal sheets or sheets of thermoplastic materials which are form stable at the temperatures used in the molding cycle.

The present invention is illustrated but in no way limited by reference to the accompanying examples.

EXAMPLE 1

A molding in the shape of a seedbox having a rectangular base measuring about 10½ by 15 inches and about one-fourth inch thick with side walls 2½ inches high consisting of a skin of one colour polymer and a core of another colour polymer was prepared as follows.

410 grams of black pigmented polypropylene (skin composition) was injected at 235°C into the one-eighth inch thick cavity of a vertical flash mold under an injection pressure of about 18,000 pounds per square inch. The walls of the mold cavity were cooled by circulating water at 70°C through the mold walls. This skin composition was injected for 2½ seconds and the clamp pressure holding the two mold halves together was then relaxed and red pigmented polypropylene (core composition) also at 235°C was injected into the mold through the same sprue as the skin composition. The red pigmented polypropylene was injected under a pressure of 18,000 pounds per square inch and the forces injecting the composition into the mold enlarged the mold cavity. After 2 seconds of injection of core composition the thickness of the part of the cavity defining the base of the seedbox had enlarged by one-eighth inch, and then the clamp pressure holding the mold halves together was increased.

After 70 seconds had elapsed from the beginning of the molding cycle the seedbox was removed from the mold and was found to weigh 618 grams. The molding had a pleasing surface finish and exhibited no line on its surface because the skin composition had completely filled the mold cavity and thus differential cooling of the melt front had not occurred, as happens when there is a stationary melt/air interface, before the injection of the core composition. When the seedbox was cut in half, the red core composition was found to be entirely surrounded by the black skin composition.

EXAMPLE 2

The process of Example 1 was repeated except that the red pigmented polypropylene was replaced by natural polypropylene containing 0.5% by weight of azodicarbonamide as blowing agent. The moulding cycle was the same except that the mold was filled with the natural polypropylene without allowing it to foam and the mold cavity was then further enlarged to increase its thickness by about one-eighth inch to allow the natural polypropylene to foam within the skin of black polypropylene.

Here again the molding exhibited no line on its surface and, when cut, the base of the molding was found to consist of a foamed core of natural polypropylene entirely surrounded by a skin of black polypropylene.

We claim:

1. In an injection molding process for the production of laminar articles having a core of a synthetic polymeric resin composition enclosed by a skin of a dissimilar synthetic polymeric resin composition, wherein a molten charge of an injection moldable skin forming synthetic polymeric resin composition is injected into a mold cavity and, before the interior of the skin forming composition has set, a molten charge of an injection moldable core forming synthetic polymeric resin composition is injected into the interior of the skin forming composition, and the compositions are maintained in the mold cavity until they have set, the improvement comprising filling the mold cavity with said skin forming composition and then injecting the core forming composition so that the injection pressure of the core forming composition forces the mold cavity to enlarge to accommodate the core forming composition as it is injected.

2. A process according to claim 1 in which the compositions are injected into the mold cavity successively through the same injection orifice.

3. A process according to claim 1 in which the mold cavity is a vertical flash mold defined by a pair of mold members slidably movable relative to one another to allow the mold cavity to enlarge without permitting loss of the synthetic polymeric resin compositions injected thereinto, said mold members being held in the smaller volume condition by a clamping force, and wherein said clamping force holding said mold members in the smaller volume condition is reduced after filling the mold cavity with the skin forming composition and whereby, on injecting the core forming composition into the mold cavity under pressure, said mold members are forced to slide relative to one another by the injection pressure of the core forming composition against said reduced clamping force so that the mold cavity is enlarged.

4. A process according to claim 1 wherein, after injecting the core forming composition, a further charge of skin forming composition is injected into the mold cavity.

5. A process according to claim 1 wherein, the core forming composition contains a blowing agent and is injected into the mold cavity above the foaming temperature thereof and said core forming composition is permitted to foam in the mold cavity.

6. A process according to claim 5, wherein the core forming composition is injected into the mold cavity and the injection pressure of the core forming composition causes the mold cavity to enlarge to accommodate the core forming composition against a restraining force sufficient to prevent foaming of the core forming composition and, after injection of the core forming composition, the mold cavity is further enlarged to permit the core forming composition to foam.

7. A process according to claim 1 wherein the skin and core forming compositions are polypropylene compositions.

8. A process according to claim 1 in which the skin and core forming compositions are polyvinyl chloride compositions.

9. A process according to claim 1 wherein the volume of the mold cavity is initially larger than the volume of the skin forming composition injected thereinto and, after injection of the skin forming composition, but before injection of the core forming composition, the volume of the mold cavity is reduced whereby the skin forming composition fills the mold cavity.

10. A process according to claim 1, wherein a material having a melting point at temperatures higher than the temperatures at which the skin and core forming compositions are injected into the mold is placed in the mold cavity as a lining of at least a part thereof before injection of the skin forming composition, whereby said lining becomes bonded to the molded article on the injection of the skin and core forming compositions and allowing the compositions to set, and after said compositions have set, removing the molded article with said lining bonded thereto from the mold cavity.

* * * * *